(12) United States Patent
Nelson et al.

(10) Patent No.: US 7,111,683 B2
(45) Date of Patent: Sep. 26, 2006

(54) FORMATION CONSOLIDATION PROCESS

(75) Inventors: Erik B. Nelson, Houston, TX (US);
Samuel Danican, Houston, TX (US);
Golchehreh Salamat, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 234 days.

(21) Appl. No.: 10/710,032

(22) Filed: Jun. 14, 2004

(65) Prior Publication Data

US 2005/0274516 A1    Dec. 15, 2005

(51) Int. Cl.
*E21B 33/14* (2006.01)

(52) U.S. Cl. ..................... 166/278; 166/292

(58) Field of Classification Search ............... 166/278, 166/285, 292
See application file for complete search history.

(56) References Cited

U.S. PATENT DOCUMENTS

| | | | |
|---|---|---|---|
| 3,593,796 A | 7/1971 | Stainback | 166/288 |
| 3,741,308 A | 6/1973 | Valey | 166/292 |
| 5,088,555 A | 2/1992 | Shu | 166/292 |
| 5,101,901 A | 4/1992 | Shu et al. | 166/276 |
| 5,304,710 A * | 4/1994 | Kigel et al. | 588/319 |
| 5,355,954 A | 10/1994 | Onan et al. | 166/292 |
| 5,362,318 A * | 11/1994 | Shu | 106/634 |
| 5,551,514 A | 9/1996 | Nelson et al. | 166/280 |
| 6,450,260 B1 | 9/2002 | James et al. | 166/277 |
| 7,013,973 B1 * | 3/2006 | Danican et al. | 166/263 |

* cited by examiner

*Primary Examiner*—William Neuder
(74) *Attorney, Agent, or Firm*—Thomas O. Mitchell; Tim Curington; Robin Nava

(57) ABSTRACT

A formation consolidation process is described which comprises injecting into an unconsolidated or poorly consolidated subterranean formation penetrated by a wellbore an aqueous pumpable system comprising an insoluble silica source (e.g., colloidal silica, silica fume or fumed silica) and a source of calcium hydroxide (e.g., aqueous solutions of calcium chloride and sodium hydroxide). The aqueous system may contain a nucleation inhibitor. The components of the aqueous system react to produce a calcium silicate hydrate gel (C-S-H gel) having cementitious properties within the pores of the formation. After the C-S-H gel sets and hardens, the consolidated formation has a high compressive strength (e.g., 500 psi (about 3.5 MPa) or more). The technique can be performed as a remedial treatment or in new completions, but it is particularly useful in workover treatments for existing wells.

14 Claims, No Drawings

FORMATION CONSOLIDATION PROCESS

BACKGROUND OF INVENTION

This invention relates to a formation consolidation process used in subterranean wells. The process comprises injecting into an unconsolidated or loosely consolidated subterranean formation penetrated by a wellbore an aqueous pumpable system containing an insoluble silica source (e.g., colloidal silica or silica fume) and a source of calcium hydroxide (e.g., a mixture of calcium chloride and sodium hydroxide in an aqueous medium). The components of the aqueous pumpable system react to produce a calcium silicate hydrate gel (C-S-H gel) with cementitious properties. The technique can be performed as a remedial treatment or in new completions, but it is particularly useful in workover treatments for existing wells.

Hydrocarbon fluids, such as oil and natural gas, and other desirable formation fluids are obtained from a subterranean geologic formation, i.e., a reservoir, by drilling a well that penetrates the formation zone that contains the desired fluid. Once a wellbore has been drilled, the well must be completed. A well "completion" involves the design, selection, and installation of equipment and materials in or around the wellbore for conveying, pumping, or controlling the production or injection of fluids. After the well has been completed, production of the formation fluids can begin.

When the subterranean formation is "soft" or poorly consolidated, small particulates (typically sand) present in the formation may dislodge and travel along with the produced fluid to the wellbore. Production of sand is highly undesirable since it erodes surface and subterranean equipment, and it must be removed from the produced fluids before they can be processed. In addition, the migrating sand can plug the flow channels in the formation and thereby necessitate other stimulation techniques, such as acid stimulation, to restore the well's performance.

Various methods have been employed to reduce or eliminate the concurrent production of sand and other particulates with the formation fluids. One common approach has been to filter the produced fluids through a gravel pack that has been placed into the wellbore. Such gravel packs are often retained by a metal screen. The produced formation fluids travel through the permeable gravel pack (and the screen) before entering the wellbore. The sand and other particulates in the produced fluids are blocked by the gravel pack. This technique has been widely used in the past, but it has several disadvantages. With time, the gravel pack and the screen may be plugged by scale or particles, or badly eroded by the sand and other particulates in the produced fluids. This reduces the effectiveness of the gravel pack and screen and may actually shut down the production if the gravel pack and/or screen becomes plugged with sand or formation fines. In addition, the presence of the metal screen in the well inhibits reentry of drills and other tools into the wellbore and the metal screen can be difficult and costly to remove.

This helps to explain the industry's desire to develop so-called screenless completion techniques. These techniques typically involve the injection of a consolidating fluid, such as a resin-based consolidating fluid, through the wellbore and into the formation surrounding the interval of interest. Resin-based consolidating fluids generally include an organic resin, a curing agent, a catalyst and an oil wetting agent. The resin system hardens in the formation, thereby consolidating it. Examples of such resin-based consolidating fluids and methods for using them are reported in many patents. See, for example, U.S. Pat. Nos. 4,291,766; 4,427,069; 4,669,543; 5,199,492; and 5,806,593. Resin-based consolidation systems may be complicated to apply, especially those involving multiple treatment stages, and the treatment results may be erratic. When the individual components of the consolidating fluid are pumped at different stages into the formation they may or may not come together in the right order, or in the right amounts, or they may not even come together at all. And, if they do come together, good mixing of the components is not assured. This helps explain the erratic and unreliable results that operators have experienced using such multi-stage consolidating fluids.

In an effort to overcome some of the disadvantages of resin-based consolidation fluids, other well treatments have been proposed which use inorganic systems to modify the formation and thereby reduce the production of formation fines.

For example, U.S. Pat. No. 3,593,796 describes a multistage process in which the following components are injected sequentially into the formation: (1) an aqueous solution containing a silicate adapted to wet the fine sand grain particles, (2) an aqueous solution of a silicate-precipitating agent capable of reacting with the silicate in solution (1) so as to form a solidifying material and therein to bind the fine sand grain particles, and (3) a solution containing an oil-wetting agent. This treatment is designed to immobilize the fine particles in the formation and prevent their migration when subjected to subsequent fluid flow. The patent states that aqueous solutions of alkaline earth metal salts (e.g., calcium chloride), acidic iron salts, and certain other metal salts can be used as the silicate-precipitating agent.

In another instance, U.S. Pat. No. 3,741,308 describes a method of converting an unconsolidated sand formation into a consolidated, permeable formation by flowing volumes of aqueous calcium hydroxide (or compounds which hydrolyze or react with each other to form calcium hydroxide) through the pores of the unconsolidated formation. The patent states that the calcium hydroxide solution could be formed by adding sodium hydroxide to a solution of calcium chloride. The patent also states that during the practice of the process the sand particles in the formation become coated with calcium silicates of unknown or indefinite composition, and proposes that the coating cements the individual grains together and increases the structural strength of the sand assemblage.

Yet another approach has been described in two companion cases (U.S. Pat. Nos. 5,088,555 and 5,101,901). In U.S. Pat. No. 5,088,555, a sand consolidation method was described involving sequential injections of (a) an aqueous solution of an alkali metal silicate and (b) certain organic solutions of a calcium salt (e.g., calcium chloride hydrate or chelated calcium) through perforations in the casing of a borehole. The components of these two solutions are said to react to form a calcium silicate cement with permeability retention characteristics in the formation interval being treated that prevents sand from being produced during the production of hydrocarbon fluids from the well. U.S. Pat. No. 5,101,901 describes a method of forming a gravel pack in a washed-out interval adjacent a borehole in an unconsolidated formation using the same sequential injection of the aqueous silicate solution and an alcoholic solution of a calcium salt. These materials react to form a calcium silicate cement, as noted in U.S. Pat. No. 5,088,555, which functions as a gravel pack to eliminate sand and other formation fines from the produced hydrocarbon fluids.

In essentially all multistage consolidation treatments, there is an element of chance in whether the reactants/ components will be combined in the formation in the proper order, the proper amounts, or whether they will even come in contact at all in the desired formation interval of interest. The efficiency of mixing/blending is also questionable. But, in some instances the multistage treatments work. For example, U.S. Pat. No. 5,551,514 describes a multi-stage consolidation followed by a hydraulic fracturing treatment in which proppant flowback control techniques are employed. This procedure has been used successfully on many wells.

To avoid the difficulties associated with multi-stage consolidation systems, U.S. Pat. No. 6,450,260 describes an alternative method of performing the technique patented in U.S. Pat. No. 5,551,514, using a single-stage flexible gel system. Following the consolidation step, the formation permeability surrounding the treated interval is too low to allow the practical production of hydrocarbons. Therefore, as illustrated in U.S. Pat. No. 5,551,514, the fracturing treatment is essential to reestablish well productivity.

Other fracturing treatments that help minimize sand production generally involve the step(s) of determining the direction of fracture propagation and then orienting or shaping the perforations to optimize the flow path between the fracture and the wellbore. Such treatments minimize the near-wellbore drawdown pressure during production, and sand production can be prevented. See, for example, U.S. Pat. Nos. 5,386,875; 6,283,214 and 6,431,278.

Though some of the above-mentioned techniques have achieved a degree of commercial success, many of them have been hindered by technical and/or cost limitations.

It is therefore an object of embodiments of the present invention to provide a single-stage formation consolidation process that can be used in subterranean wells. Like U.S. Pat. No. 6,450,260, it is also an object of the present invention to render the consolidated zone of the formation impermeable, or essentially impermeable, to the flow of formation fluids. After the consolidation treatment, hydraulic fracturing optionally coupled with proppant flowback control is performed to optimize communication with the productive formation and prevent sand production.

It is another object of embodiments of the present invention to provide a screenless completion process for completing an unconsolidated interval and preventing or substantially reducing the concurrent production of sand and other particulates with the formation fluids.

These and other objects are achieved by embodiments of the invention set forth below.

SUMMARY OF INVENTION

A single-stage formation consolidation process comprises injecting into an unconsolidated or poorly consolidated subterranean formation penetrated by a wellbore an aqueous pumpable system comprising an insoluble silica source and a source of calcium hydroxide, in an amount sufficient to penetrate and fill the pores of the formation in the interval to be treated. The aqueous pumpable system may comprise a nucleation inhibitor. The components of the aqueous system react to produce a calcium silicate hydrate gel (C-S-H gel) with cementitious properties. The formation is consolidated once the C-S-H gel sets and hardens within the pores of the formation. The technique can be performed as a remedial treatment or in new completions, but it is particularly useful in workover treatments for existing wells.

DETAILED DESCRIPTION

In the process, the pumpable aqueous system (also referred to below as a consolidation fluid) is generally pumped into the unconsolidated or loosely consolidated formation through one or more perforations in the casing of a cased hole, but it may also be used in an open hole. The aqueous system is mixed and pumped into position at a pressure below the formation fracturing pressure. The aqueous system penetrates and fills the pores of the formation in the treated interval. When we say that the pores are filled, we mean that they are filled at least sufficiently so that the reaction satisfactorily consolidates the formation. The unconsolidated sand and other formation fines in contact with the aqueous system are thereby incorporated into and/or bonded to the calcium silicate hydrate gel, as it is formed in situ. The formation is consolidated when the calcium silicate hydrate gel hardens. The resulting consolidated formation is strong and it has high compressive strength.

The components of the aqueous pumpable system are known classes of compounds having many members, any combination of which may be used in the present invention provided they undergo the pozzolanic reaction to form a calcium silicate hydrate. However, certain combinations of components may be more desirable than others, based on cost, availability, the pumping characteristics of the aqueous composition containing the components, the characteristics of the calcium silicate gel formed by the combination of components (e.g., porosity, permeability, compressive strength, etc.), or the characteristics of the subterranean formation. The skilled artisan will be able to select the combination of components that he/she believes is best for the well or formation being treated by the process. Preferred combinations of components will form a consolidated formation having a compressive strength of at least about 500 psi (about 3.5 MPa). The compressive strength can be measured using the equipment and procedures set forth in API Spec 10.

The silica source component in the aqueous system may be any of the known family of materials known as pozzolans, provided that the silica particle size is small enough to enter the pores of the region to be consolidated. A pozzolan is defined as a siliceous or siliceous and aluminous material, which in itself possesses little or no cementitious value but that will, in finely divided form and in the presence of moisture (i.e., water), chemically react with calcium hydroxide to form compounds (i.e., calcium silicate hydrate gels) that do possess cementitious properties. Pozzolans can be silica fume, fumed silica, precipitated silica, colloidal silica, calcined clay, fly ash, and the like. However, colloidal silica, silica fume and fumed silica are preferred pozzolans, based on cost and availability. Colloidal silica systems are commercially available at concentrations of from about 15 to about 50 weight percent (wt. %) silica. Such silica systems can be used as such or diluted with water, if desired, to about 2 wt. % but concentrations of from about 25 to about 50 wt. % may be used to reduce the amount of fluid pumped into the formation in embodiments of the present invention.

The source of calcium hydroxide may also be any of the known family of materials. Obviously, calcium hydroxide can be used provided that the calcium hydroxide particles/crystals are small enough to enter the pores of the formation, but the particles in most current commercial calcium hydroxides are too large. In one embodiment, therefore, the calcium hydroxide component is prepared by blending a soluble calcium salt (e.g., calcium chloride or calcium chloride hydrate) with an aqueous inorganic base (e.g., aqueous sodium hydroxide) to form calcium hydroxide in situ within the wellbore as the system is being pumped and/or within the pores of the formation. Aqueous solutions of the calcium salt (e.g., calcium chloride) are normally used at concentrations of from about 1 to about 50 weight percent (wt. %), and preferably from about 20 to about 50 wt. %. Aqueous solutions of the inorganic base (e.g., sodium hydroxide) may be used in embodiments of the invention at concentrations of from about 1 to about 50 weight percent (wt. %), and in some embodiments from about 20 to about 50 wt. % may be used. In embodiments in which the higher concentrations are used, less fluid is pumped into the formation.

The aqueous pumpable system is prepared by mixing or blending the components in an aqueous medium. The aqueous medium can be fresh water. However, the aqueous medium can contain minor amounts of a solubilizing agent (e.g., methanol, ethanol or methyl tertiary-butyl ether) or a pH adjuster (e.g., sodium hydroxide), nucleation inhibitors (e.g., hexasodium diethylene triamine penta(methylene phosphonate), ethylene diamine tetra(methylene phosphonic acid), etc.), water-soluble sulfonated aromatic polymers, and the like, iron control agents (e.g., triethanolamine), cement retarders (e.g., lignosulfonates), surfactants and other additives. The rate at which calcium hydroxide forms can be high; therefore, in some embodiments a nucleation inhibitor may be included in the aqueous system to keep the particle size of the calcium hydroxide formed during the mixing/blending/pumping stage(s) small enough to enter the pores of the formation. The concentration of the components in the aqueous system can be varied, but commonly a very low solids concentration is used. The stoichiometry of the pozzolanic reaction between the components is variable. Normally, a calcium/silica mole ratio of from about 0.8 to about 2.5 is used. A mole ratio of $CaO/SiO_2$ of from about 1 to about 2 is one example; and a mole ratio of from about 1.3 to about 1.5 of such materials is another example. The components may be blended "on-the-fly" using equipment on the surface to pump the aqueous fluid into the wellbore. In some embodiments, aqueous solutions or slurries of the components are prepared at the surface and such aqueous solutions/slurries are blended as they are pumped concurrently into the wellbore.

The volume of consolidation fluid to be injected into the formation is primarily a function of the formation pore volume to be treated. The formation pore volume can be determined by one of ordinary skill in the art using known laboratory techniques. The volume of consolidation fluid obviously relates to the height of the zone to be treated and the depth of penetration into the formation that is desired (the volume will increase in each instance). In some embodiments, the depth of penetration will be at least about one foot (about 30 cm) radially from the wellbore into the formation. The ability of the consolidating fluid to penetrate the formation depends on the permeability of the formation and the viscosity of the consolidation fluid. If the permeability of the formation is high and/or the viscosity of the consolidation fluid is low, then the ability of the consolidation fluid to penetrate the formation is enhanced. The ability of the consolidation fluid to penetrate the formation is also enhanced at higher pump pressures, so long as the pressure used is below the fracturing pressure.

One of the advantages of embodiments of the present invention is that the operator does not have to use a pretreatment or a pre-flush to make the formation oil-wet before injecting the pumpable aqueous system into the wellbore. However, the operator may find it advantageous to circulate an aqueous system containing a minor amount of a clay stabilizer (e.g., tetraalkylammonium halides) through the well to remove contaminants in the well before injecting the consolidation fluid of the present invention. The portion, if any, of such aqueous systems remaining in the wellbore will be injected into the formation during the practice of the invention and can assist in stabilizing clays in the formation and thereby reduce formation damage. A post-flush with such an aqueous medium may also be beneficial to clear the wellbore of the reactive silicon and calcium hydroxide components. This is particularly true of a new well. However, one should be careful not to inject the post-flush into the formation because this would sweep the cementitious material away from the near-wellbore region. If the process is being used as a remedial treatment of an older well, however, the operator may wish to leave the wellbore at least partially filled with the reactive components and let the C-S-H gel form in the wellbore (in addition to the interval surrounding the wellbore). The operator can then drill through the C-S-H gel plug that forms in the wellbore and reperforate the casing. In this manner, old perforations are plugged with the C-S-H gel and cementitious material, which acts as a diverter, and hydraulic fracturing can be done through the new perforations in the interval(s) of interest. Various phased perforation techniques and/or fracturing techniques can be beneficially applied to stimulate the production of formation fluids by fracturing through the consolidated formation, and proppant packs containing fibers or resin-coated materials such as proppant and/or fibers can also be beneficially used in the stimulation treatment. An exemplary proppant-retention agent is a fiber commercially available from Schlumberger under the tradename PropNET™. The proppant-retention agent keeps the proppant in the fracture, and the proppant and proppant-retention agent keep formation particles from being produced concurrently with the formation fluids. This fracturing technique is illustrated, for example, in U.S. Pat. No. 6,450,260, the disclosure of which is incorporated herein by reference.

EXAMPLES

Example 1

This example illustrates the use of the present invention to consolidate a formation in a zone adjacent a perforated cased well. Retrievable packers are set above and below the interval to be treated. The upper packer is equipped to accommodate a "stinger," allowing fluids to enter the space between the packers. An aqueous solution of 2 weight percent tetramethylammonium chloride ("TMAC") is pumped through the well in order to clean the well and remove contaminants. Next, a consolidation fluid comprising colloidal silica (Ludox™), aqueous sodium hydroxide, and aqueous calcium chloride is formed by blending the components on-the-fly as the fluid is pumped into the well and through the perforations into the formation. The Ca/Si ratio of the components is in the range of from about 1.3 to about 1.5 moles of calcium per mole of silica. All pumping operations are performed at pressures below the fracturing pressure. The volume of consolidation fluid is sufficient to fill the pore volume and consolidate the formation within about a one-foot (about 30 cm) radius around the wellbore. A calcium silicate hydrate gel forms within the pores of the formation and forms a consolidated formation as the gel hardens. The consolidated formation has an unconfined compressive strength of about 500 psi (about 3.5 MPa) or more, as measured by the equipment and procedures set forth in API Spec 10. A hydraulic fracturing treatment is subsequently performed by pumping an aqueous hydraulic fracturing fluid into the well and into contact with the consolidated formation at elevated fracturing pressures, in accordance with well-known procedures. The fracture extends beyond the consolidated region of the formation. The fracturing fluid carries proppant into the fracture at one or more stages of the fracturing treatment and creates a proppant pack in the fracture through which the formation fluids flow into the well and are recovered. During the proppant stage of the fracturing treatment, methods to prevent proppant flowback are applied (e.g., resin coated proppant, fibers or both are emplaced within the fracture by the fracturing fluid). The resulting proppant pack prevents the production of formation sand through the perforations connecting with the fracture. Any perforations that do not connect with the fracture remain sealed by the consolidated formation. After fracturing, the well is successfully returned to production.

Example 2

This example illustrates the use of the present invention to consolidate an interval of a formation penetrated by an open hole. Retrievable inflatable packers are set above and below the interval to be treated. The upper packer is equipped to accommodate a "stinger," allowing fluids to enter the space between the packers. An aqueous solution of 2 weight percent tetramethylammonium chloride ("TMAC") is pumped through the well in order to clean the well and remove contaminants. Next, a consolidation fluid comprising colloidal silica (Ludox™), aqueous sodium hydroxide, and aqueous calcium chloride is formed by blending the components on-the-fly as the fluid is pumped into the well and through the perforations into the formation. The Ca/Si ratio of the components is in the range of from about 1.3 to about 1.5 moles of calcium per mole of silica. All pumping operations are performed at pressures below the fracturing pressure. The volume of consolidation fluid is sufficient to fill the pore volume and consolidate the formation within about a one-foot (about 30 cm) radius around the wellbore. A calcium silicate hydrate gel forms within the pores of the formation and forms a consolidated formation as the gel hardens. The consolidated formation has an unconfined compressive strength of about 500 psi (about 3.5 MPa) or more, as measured by the equipment and procedures set forth in API Spec 10. A hydraulic fracturing treatment is subsequently performed by pumping an aqueous hydraulic fracturing fluid into the well and into contact with the consolidated formation at elevated fracturing pressures, in accordance with well-known procedures. The fracture extends beyond the consolidated region of the formation. The fracturing fluid carries proppant into the fracture at one or more stages of the fracturing treatment and creates a proppant pack in the fracture through which the formation fluids flow into the well and are recovered. During the proppant stage of the fracturing treatment, methods to prevent proppant flowback are applied (e.g., resin coated proppant, fibers or both are emplaced within the fracture by the fracturing fluid). The resulting proppant pack prevents the production of formation sand through the perforations connecting with the fracture. Any perforations that do not connect with the fracture remain sealed by the consolidated formation. After fracturing, the well is successfully returned to production.

Example 3

This example illustrates the use of the present invention to consolidate a formation in a failed sand control situation involving a previously placed gravel pack. In this remedial treatment, an aqueous solution of 2 wt. % TMAC is pumped into the well, through the slotted screen that holds a gravel pack in the annulus between the slotted screen and the formation, and into contact with the formation. A consolidation fluid as described in Example 1 is then pumped into the well and through the screen in an amount sufficient to fill the pore volume of the gravel pack and enough excess to fill the pore volume in the near wellbore region in the formation. The consolidating fluid forms a C-S-H gel within the gravel pack and near wellbore region of the formation. After the C-S-H gel has set and hardened, a perforating gun is lowered inside the slotted screen and perforations are shot into the zone of interest. A fracturing treatment is then performed, as illustrated in Example 1, to reestablish contact with the productive formation. After fracturing, the well is successfully returned to production with little or no formation sand in the recovered fluids.

The invention claimed is:

1. A formation consolidation process comprising injecting, into a subterranean formation penetrated by a wellbore, an aqueous pumpable system comprising an insoluble silica source and a source of calcium hydroxide, that forms particles of silica and particles of calcium hydroxide each small enough to enter the pores of the formation, and in an amount sufficient to allow the system to form a calcium silicate hydrate gel within the pores of the formation.

2. The process defined by claim 1 wherein the wellbore is a cased borehole and said aqueous system is pumped into contact with the formation through one or more perforations in the casing.

3. The process defined by claim 1 wherein the wellbore is open-hole.

4. The process defined by claim 1 wherein the source of silica is colloidal silica, silica fume or fumed silica.

5. The process defined by claim 1 wherein the source of calcium hydroxide is a combination of an aqueous calcium salt and an aqueous sodium hydroxide or potassium hydroxide.

6. The process defined by claim 5 wherein said calcium salt is calcium chloride or calcium chloride hydrate.

7. The process defined by claim 5 wherein the source of silica is colloidal silica, silica fume or fumed silica.

8. The process defined by claim 1 wherein the components of said aqueous pumpable system are blended on-the-fly as the aqueous system is pumped into the wellbore.

9. The process defined by claim 1 wherein the consolidated formation has a compressive strength of at least about 500 psi (about 3.5 MPa), as determined by API Spec 10.

10. The process defined by claim 1 wherein the aqueous system additionally comprises a nucleation inhibitor.

11. The process defined by claim 7 wherein the aqueous system additionally comprises a nucleation inhibitor.

12. A consolidated formation produced by the process defined by claim 1.

13. The process defined by claim 1 wherein the consolidated formation is subsequently hydraulically fractured.

14. A well treatment process comprising injecting into a gravel pack an aqueous pumpable system comprising an insoluble silica source and a source of calcium hydroxide, that forms particles of silica and particles of calcium hydroxide each small enough to enter the pores of the gravel pack, and in an amount sufficient to allow the system to form a calcium silicate hydrate gel within the pores of the gravel pack.

* * * * *